United States Patent
Hayano et al.

(10) Patent No.: US 9,987,865 B2
(45) Date of Patent: Jun. 5, 2018

(54) POLYESTER FILM

(71) Applicant: Toray Industries, Inc., Tokyo (JP)

(72) Inventors: Tomoko Hayano, Godo (JP); Jun Takahashi, Godo (JP)

(73) Assignee: Toray Industries, Inc. (JP)

( * ) Notice: Subject to any disclaimer, the term of this patent is extended or adjusted under 35 U.S.C. 154(b) by 0 days. days.

(21) Appl. No.: 15/316,042

(22) PCT Filed: Jun. 9, 2015

(86) PCT No.: PCT/JP2015/066584
§ 371 (c)(1),
(2) Date: Dec. 2, 2016

(87) PCT Pub. No.: WO2015/194418
PCT Pub. Date: Dec. 23, 2015

(65) Prior Publication Data
US 2017/0087911 A1    Mar. 30, 2017

(30) Foreign Application Priority Data

Jun. 19, 2014 (JP) ................................. 2014-126131

(51) Int. Cl.
*B41J 31/05* (2006.01)

(52) U.S. Cl.
CPC .................................... *B41J 31/05* (2013.01)

(58) Field of Classification Search
CPC ...... C08J 7/04; C08J 5/18; B41J 31/05; B32B 27/46; B41M 5/382; B41M 5/40
See application file for complete search history.

(56) References Cited

U.S. PATENT DOCUMENTS

| | | | | | |
|---|---|---|---|---|---|
| 4,233,352 | A | * | 11/1980 | Ono | C08J 7/047 427/127 |
| 5,407,724 | A | * | 4/1995 | Mimura | B41M 5/41 428/32.67 |
| 6,303,210 | B1 | | 10/2001 | Watanabe et al. | |
| 6,537,657 | B1 | * | 3/2003 | Watanabe | B41M 5/41 428/331 |
| 6,610,384 | B2 | * | 8/2003 | Takada | B41M 5/41 428/141 |
| 2003/0099852 | A1 | | 5/2003 | Takada et al. | |

FOREIGN PATENT DOCUMENTS

| | | |
|---|---|---|
| JP | 2-16086 A | 1/1990 |
| JP | 2-16087 A | 1/1990 |
| JP | 7-81018 A | 3/1995 |
| JP | 9-239931 A | 9/1997 |
| JP | 2000-108200 A | 4/2000 |
| JP | 2003-136655 A | 5/2003 |
| JP | 2004-59861 A | 2/2004 |
| JP | 2006-334814 A | 12/2006 |
| JP | 2012-206045 A | 10/2012 |
| JP | 2013-151155 A | 8/2013 |

* cited by examiner

*Primary Examiner* — Nathan L Van Sell
(74) *Attorney, Agent, or Firm* — DLA Piper LLP (US)

(57) ABSTRACT

A polyester film has a wax on a surface of one side of the film and is a polyester film in which this wax is dispersed in the form of islands on the surface of the film, and a filling factor of the wax in the film surface is 20 to 45%, and, as for a number of islands of the wax dispersed in the form of islands and each of which has an area of 200 μm² or larger, there is one or less/10000 μm².

6 Claims, 2 Drawing Sheets

POLYESTER FILM

TECHNICAL FIELD

This disclosure relates to a polyester film that has, on its one-side surface, a wax. More specifically, the disclosure relates to a polyester film which reduces transfer marks of a slipping layer (wax) that occur, when the film is wound up, on a surface of the film on which a transfer layer is to be provided, and whose use as a thermal transfer ribbon can achieve excellence in anti-stick property and tremendously improve the image quality at the time of printing.

BACKGROUND

Polyester films made of polyethylene terephthalate, polyethylene-2,6-naphthalate and the like are excellent in mechanical characteristic, heat resistance, dimensional stability, drug resistance, cost performance characteristic and so forth, and are applied in many uses by utilizing those performances. As one of the uses, a ribbon for thermal transfer can be cited.

A thermal transfer recording method that employs a ribbon for thermal transfer is excellent in cost performance, maintenance characteristic, operation characteristic and so forth and therefore are used in the fields of FAX, bar code printing and the like. In recent years, the use of color thermal transfer inks has added characteristics such as high definition and high image quality, and thus the thermal transfer recording method is used also in color thermal transfer printers and the like.

Such thermal transfer recording methods are methods in which an ink ribbon for thermal transfer in which a thermal transfer layer that contains a color material such as a pigment or a dye and so forth, and a binding agent is provided on a polyester film is superposed on an image-receiving sheet and, from the reverse side of the thermal transfer ink ribbon, heat is applied by a thermal head to melt the aforementioned thermal transfer layer and therefore fuse it onto the image-receiving sheet so that an image is formed on this image-receiving sheet.

As for the thermal transfer ink ribbon, because heat is applied thereto by a thermal head as mentioned above, the film for use in an ink ribbon for thermal transfer is required to have heat resistance. Furthermore, from the viewpoint of causing the sliding between the thermal head and the polyester film (anti-stick property) at the time of printing to be favorable to improve image quality, the film for use in the ink ribbon for thermal transfer is required to have a sliding characteristic as well. To obtain a film that has the aforementioned characteristics, it has been a common practice to provide on the aforementioned polyester film a slipping layer that is good in heat resistance and anti-stick property as a slipping layer of the thermal transfer ink ribbon which forms the opposite side to the surface on which the ink is provided.

However, the surface of the polyester film is low in wettability and therefore poor in adhesion property, and therefore has a problem that if a slipping layer in which wax or the like is a main component is directly coated on the surface of the polyester film, the slipping layer does not become closely attached. Therefore, to make the adhesion property with respect to the slipping layer firm, the film surface is subjected to an electric discharging treatment (electric discharge (EC) treatment) or the like in various gas atmospheres and the like to better the wettability of the film surface and then a slipping layer is provided. Thus, various investigations to achieve both the anti-stick property and the adhesion property between the polyester film and the slipping layer have been carried out.

For example, a proposal in which wax is further added in a substrate of a film on which wax is provided (refer to Japanese Unexamined Patent Publication bulletin (Kokai) No. H7-81018) and, furthermore, a proposal in which the coefficient of static friction and the three-dimensional roughness of a film are prescribed (refer to Japanese Unexamined Patent Publication bulletin (Kokai) No. 2004-59861), and a proposal in which the composition of the slipping layer is prescribed (refer to Japanese Unexamined Patent Publication bulletin (Kokai) No. H9-239931) are cited. Attempts to provide a slipping layer more excellent in anti-stick property have been made.

However, in recent years, a demand for high-definition and high-image quality color printing is increasing in the use for thermal transfer ribbons. For high-definition and high-image quality color printing, there is a need to perform high-level adjustment of the amount of transfer of ink by adjusting the amount of heat from the thermal head. To that end, the film for an ink ribbon for thermal transfer is required to have ink coating uniformity characteristic on the transfer layer side.

Furthermore, a film before being provided with a transfer layer is wound as a film roll and stored due to the nature of the processing steps. If a wax component of the slipping layer is provided in a large amount to improve the anti-stick property, there is a tendency that, at the time of winding the film, the wax of the slipping layer is transferred to the surface of a face of the film on which a transfer layer is to be provided, or that, when the film roll is stored for a long time, the film roll becomes wound tighter due to air pressure or temperature in the chamber and, as for the transfer thereof, denser transfer will result. Such transfer impedes a product to be used in thermal transfer use from generating high-definition and high-image quality colors because, starting at the location where transfer of wax has occurred, the transferred component repels application of ink.

Therefore, it could be helpful to provide a polyester film excellent in anti-stick property and whose slipping layer does not affect the transfer layer at the time of printing so that high-image quality printing can be performed.

SUMMARY

The polyester film is a polyester film having a wax on a surface of one side of the film, the polyester film being characterized in that the wax is dispersed in the form of islands on the surface of the film, a filling factor of the wax in the film surface is 20 to 45%, and, as for a number of islands of the wax which are dispersed in the form of islands and each of which has an area of 200 $\mu m^2$ or larger, there is one or less/10000 $\mu m^2$.

According to a preferable aspect of the polyester film, a number of protrusions (SPc) on the surface of the polyester film which has the wax is 300 to 500/0.2 $mm^2$.

According to a preferable aspect of the polyester film, the polyester film contains a particle in an amount of 0.4 to 1.0 wt % relative to an entire polyester resin composition that constitutes the film and a thickness of the film is 2 to 20 $\mu m$.

An ink ribbon for thermal transfer can be produced by using the polyester film.

A thermal transfer ink ribbon can be produced by providing a one-side surface of the polyester film with a transfer layer and providing the opposite surface to the transfer layer with a slipping layer in which the wax is a main component.

A polyester film able to restrain transfer marks of a slipping layer which occur, when the film is wound, on a surface of the film on which a transfer layer is to be provided is obtained. By using the polyester film as a thermal transfer ribbon, the anti-stick property can be excellent and the image quality at the time of printing can be tremendously improved.

EXPLANATION OF NUMERALS

Figure 1:
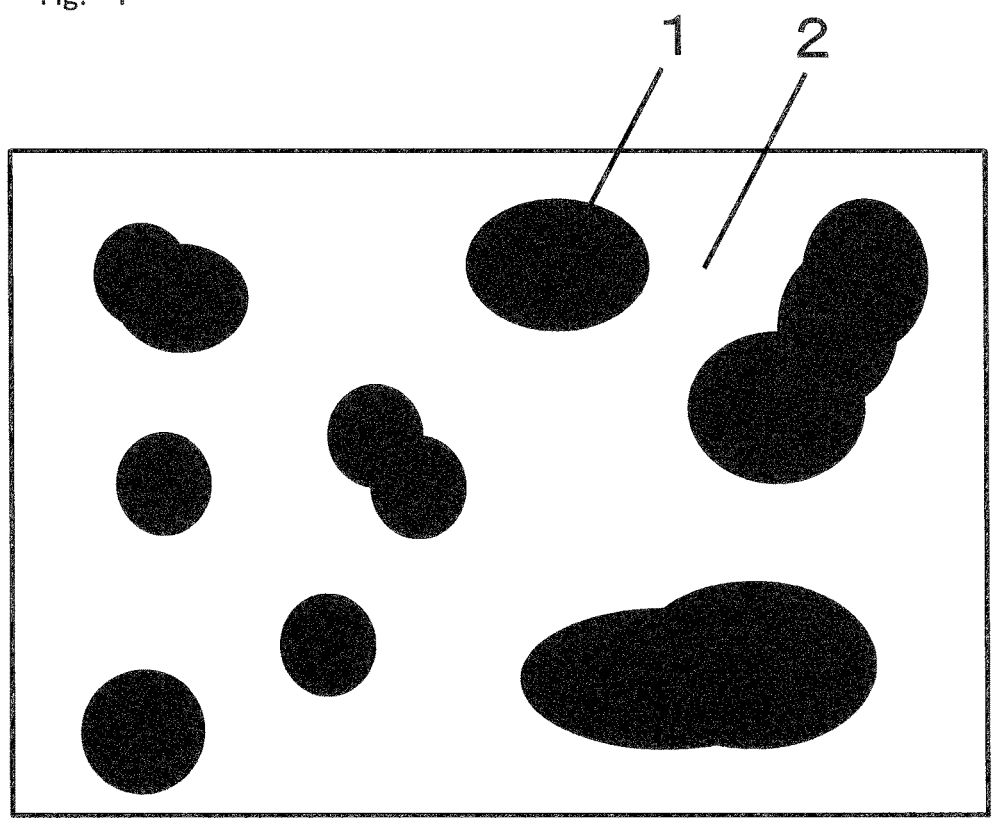
FIG. 1 is a surface view schematically showing a surface on a side of the polyester film provided with a wax.

1: wax
2: polyester film

DETAILED DESCRIPTION

The polyester film is a polyester film having a wax on a surface of one side of the film, the polyester film being characterized in that the wax is dispersed in the form of islands on the surface of the film, a filling factor of the wax in the film surface is 20 to 45%, and, as for a number of islands of the wax which are dispersed in the form of islands and each of which has an area of 200 μm$^2$ or larger, there is one or less/10000 μm$^2$.

The polyester film is formed from a polyester that can make a high-strength film due to molecular orientation involved in stretching. As the polyester used, polyethylene terephthalate or polyethylene-2,6-naphthalate is preferably used. These polyesters may be polyester copolymers. Of the repeating structural units thereof, it is preferable that preferably 80 mol % or more be ethylene terephthalate or ethylene-2,6-naphthalate.

As other polyester copolymerization components, there can be cited diol components, including diethylene glycol, propylene glycol, neopentyl glycol, polyethylene glycol, p-xylene glycol, 1,4-cyclohexane dimethanol and so forth, or dicarboxylic acid components, including adipic acid, sebacic acid, phthalic acid, isophthalic acid, 5-sodium sulfoisophthalate, 2,6-naphthalene dicarboxylic acid and so forth, or multifunctional dicarboxylic acid components, including trimellitic acid, pyromellitic acid and the like, or p-hydroxy ethoxy benzoic acid and the like. Furthermore, the foregoing polyesters may be subjected to copolymerizing or blending with one or more species of sulfonic acid alkali metal salt derivatives not having reactivity with the foregoing polyesters and polyalkylene glycols and aliphatic polyesters being insoluble in the polyesters up to such an extent that the amount thereof does not exceed 5 mol %.

It is a preferable aspect that a resin that constitutes the polyester film does not contain wax. If wax is contained in the resin that constitutes the polyester film, a wax component separates out on the film surface due to heat load that the film receives at the time of production so that it becomes difficult to adjust the form of dispersion of wax on the film surface such that the desired range is attained.

The polyester film needs to be a film that has wax on the surface of one side of the film. The wax is needed as a slipping layer in view of preventing fusion with the thermal head at the time of printing and in view of preventing the blocking with the thermal transfer ink. As for the wax, commercially sold various waxes, for example, petroleum based waxes, vegetable waxes, animal based waxes, low molecular weight polyolefins and so forth, can be used; particularly, petroleum based waxes and vegetable based waxes are preferably used in view of easy-slipping property.

When the static friction coefficient ratio of the surface that has wax is 0.40 or less, it is determined that the surface of the film has wax. As for the static friction coefficient ratio, the wax surfaces of films are subjected to a measurement under the conditions: a sample moving speed of 200 mm/min, a load of 200 g, and a contact area of 63.5 mm×63.5 mm, by using a Surface Property Tester HEIDON-14DR made by Shinto Scientific Co., Ltd., according to ASTM D-1894-63, with an Analyzing Recorder TYPE: HEIDON 3655E-99 for recording, followed by evaluation.

As for the wax, petroleum based waxes, animal based waxes, vegetable waxes or the like can be cited.

As the petroleum based waxes, paraffin waxes, microcrystalline waxes, petrolactam, oxidation waxes and so forth, particularly, paraffin waxes are preferably used.

As the animal based waxes, beeswax, lanolin, whale wax, ibota-insect wax, shellac wax, coccuscacti wax, waterfowl wax and so forth can be used.

Furthermore, as the vegetable waxes, there can be cited candelilla wax, carnauba wax, rice wax, palm wax, Japan wax, jojoba wax, ouricury wax, sugarcane wax, esparto wax, bark wax, rosin modified wax and so forth.

The molecular weight of the wax for use is preferably 10000 or less and, more preferably, 1000 or less in view of dispersibility in water.

With regard to the foregoing waxes, it is preferable that a petroleum based wax be used in the form of a mixture of a vegetable wax; particularly, it is preferable to use a mixture of a paraffin wax and a rosin modified wax.

Together with the foregoing wax, various additives can be used in such ranges that the advantageous effects are not inhibited. For example, antielectrostatic agents, heat-resistant agents, antioxidative agents, organic and inorganic particles, pigments and so forth can be used. The polyester film having a wax on its one-side surface can be obtained by, preferably, coating the one-side surface of the polyester film with a coating liquid that contains the wax and then drying the coating liquid. Herein, it is preferred that the wax concentration (solid content concentration) in the coating liquid is 0.3 wt % to 1.0 wt %, and more preferably 0.4 wt % to 0.6 wt %.

It is preferred that the thickness of the wax is 1 nm to 20 nm. The thickness of the wax mentioned herein can be determined by observing a film sectional surface by a measurement method described below. Concretely, a film sectional surface is observed and the maximum thickness of the thicknesses of the wax present on the surface of the film within the observation field of view is determined.

The thinner the thickness of the layer that contains the wax, the more the transfer to the transfer layer side of the film can be restrained. However, if the thickness of the layer is made excessively thin, the sliding characteristic becomes poor so that when the film is made into a thermal transfer ribbon, the ribbon film and the thermal head of the printer fuse, that is, the so-called anti-stick property deteriorates. The thickness of the layer that contains the wax is preferably 1 nm to 10 nm and more preferably 2 nm to 8 nm. Besides, if this thickness exceeds 20 nm, the wax will be applied more than necessary. Therefore, when the wax is dried, there are cases where the wax cannot be dried out during the production processes and the wax separates and adheres to the reverse surface of the film.

As for the polyester film, the filling factor of the wax in the film surface needs to be 20% to 45%. By making the filling factor of the wax in the film surface within the foregoing range, it becomes possible to restrain the occurrence of transfer marks while maintaining the impartation of the anti-stick property. The filling factor of the wax in the film surface refers to the proportion of the occupation by the wax in the film surface in a view from above the film. If this filling factor is less than 20%, a transfer mark is unlikely to occur, but the amount of the wax on the film surface becomes insufficient so that when a thermal transfer ribbon is made from the film, the anti-stick property deteriorates. When this anti-stick property deteriorates, the print has wrinkling and therefore the print property deteriorates.

Furthermore, if the filling factor exceeds 45%, the anti-stick property improves, but the amount of occupation by the wax in the entirety becomes high so that the wax is likely to transfer to the transfer layer side. Furthermore, if the filling factor exceeds 45%, individual islands are densely crowded together on the film surface so that it becomes likely that individual islands will become connected to adjacent islands, leading to occurrence of islands of the wax whose areas exceed 200 $\mu m^2$ and resulting in occurrence of transfer marks of the wax. A preferable filling factor of the islands is 20 to 30%.

It is necessary that the wax be dispersed in the form of islands on the surface of one side of the film and that, as for a number of islands of the wax having an area of 200 $\mu m^2$ or larger per island, there is one or less/10000 $\mu m^2$. The area per island is determined on the assumption that, with regard to the wax present on the film surface, completely separate insular regions are each an island. Because the wax exists in a dispersed form of islands, the transfer mark of the wax on the transfer layer side can be restrained when the film is wound up.

On another hand, even when the wax exists in the form of islands on the film surface, as for a number of islands of the wax having an area 200 $\mu m^2$ or larger per island, despite the need for there to be one or less/10000 $\mu m^2$, many islands having an area per island of 200 $\mu m^2$ or larger exist, this becomes a cause of occurrence of transfer marks of the wax and deteriorates the print property. If the area per island is greater than or equal to 200 $\mu m^2$, transfer marks of the wax are likely to occur, leading to occurrence of coating unevenness or coating repellence of a transfer layer (ink layer) provided on the transfer marks. Therefore, by causing there to be one or less/10000 $\mu m^2$ which exceeds at least 200 $\mu m^2$, it becomes possible to restrain transfer marks of the wax of the film.

As for a number of islands of the wax having an area of 200 $\mu m^2$ and larger per island, there is more preferably 0.5 or less/10000 $\mu m^2$.

The filling factor of the wax in the film surface is 20 to 45% and, as for a number of islands of the wax having areas of 200 $\mu m^2$ and larger, there is one or less/10000 $\mu m^2$, (a) the amount of particles contained in the film is made within a specific range, (b) after the surface of the film is subjected to an electric discharge treatment under a specific condition, a coating liquid containing the wax is coated, (c) the surface of the film is coated with a coating liquid in which the wax concentration has been adjusted, (d) an appropriate coating method is selected, and (e) after being coated with a coating liquid containing the wax, the film is stretched at least in a uniaxial direction. If the foregoing (a) and at least one or more measures of the foregoing (b) to (e) are combined, the uniform coating with the coating liquid containing the wax will make the achievement.

The surface of the polyester film will be described schematically by using FIG. 1. The polyester film can be schematically represented by a polyester film 2 in FIG. 1 and is made up of a construction that includes the polyester film 2 and a wax 1 on its one-side surface. When the polyester film is observed from the surface of the polyester film 2 which has the wax 1, the wax 1 is observed on the film.

Figure 2:
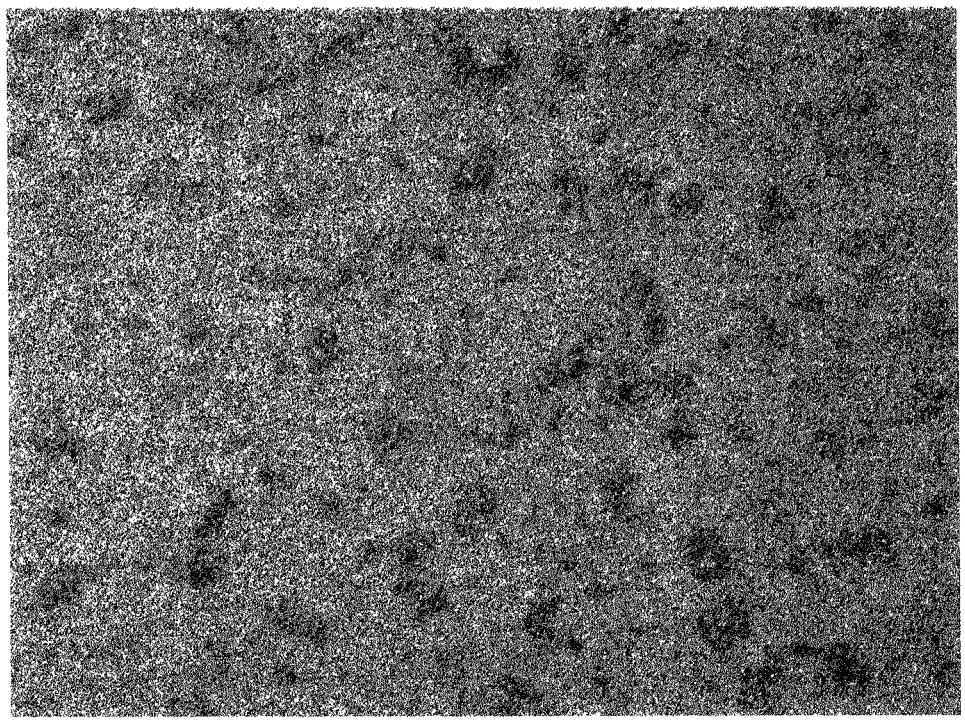
FIG. 2 is a drawing-substituting photograph obtained when the surface on a wax-provided side of a polyester film described in Example 1 was magnified 50 times under a microscope.

Concretely, the polyester film is of a photograph magnified 50 times under a microscope shown in FIG. 2. Using this photograph as an image, a measurement method described below allows the wax 2 to be prescribed.

As a method of coating a coating liquid to the surface of the film in (d) mentioned above, for example, a bar coating method and a gravure coating method can be cited. The bar coating method is a coating method in which after the film is coated in excess with the coating liquid, surplus coating liquid is scraped off by a bar. The gravure coating method is a method in which the coating liquid is coated by a mode of providing only a necessary coating liquid on a bar and transferring the coating liquid to the film. In the bar coating method, since the coating liquid is used in excess, the coating liquid is likely to concentrate at a single location due to surface tension and tends to increase the areas of the islands. It is a preferred mode to use the bar coating method in combination with a corona electric discharge treatment.

Therefore, merely coating a one-side surface of the polyester film with a coating liquid containing wax by a conventionally known bar coating method does not easily achieve the uniform coating because of the surface tension of the coating liquid so that it is not possible to make the filling factor of the wax greater than or equal to 20% while achieving that, as for a number of islands of the wax having an area 200 $\mu m^2$ or larger per island, there is one or less/10000 $\mu m^2$.

Furthermore, when coating is carried out by a conventionally known gravure coating method, dispersed coating can be achieved but, at individual sites coated with the coating liquid of wax, the dispersion diameter of the wax is small due to the surface tension of the coating liquid so that the filling factor of the wax cannot become 20% or greater. Furthermore, when the wax concentration in the coating liquid is increased, the dispersibility of the wax becomes poor so that it is not possible to make the filling factor of the wax greater than or equal to 20% while achieving that, as for a number of islands of the wax having an area 200 $\mu m^2$ or larger per island, there is one or less/10000 $\mu m^2$.

The wax present on the surface of the film is poor in the anti-stick property in some cases if the dispersion diameter of the wax is excessively small. Therefore, in the polyester film, it is preferable that, as for a number of islands of the wax having an area 50 $\mu m^2$ or larger per island, there is 10 or more /10000 $\mu m^2$ and more preferably 15 or more /10000 $\mu m^2$.

It is preferable that the polyester film contain particles. Causing particles to be contained in the film results in particles separating out on the surface of the film so that when that film surface is coated with a coating liquid containing wax, the wax gathers around the separated-out particles due to the surface tension of the particles and the gathered wax forms island constructions. Therefore, it becomes easy to disperse the wax in the form of islands. If the particles contained in the film become many, adjacent particles form island constructions of the wax and the island constructions and, even after the film is stretched after being coated, there is still a state in which the island constructions remain and there is a tendency of increasing the areas of the islands of the wax.

Although the particle content depends on the thickness of the film or the amount of particles separated out to the surface of the film, it is preferable that, as for the particle content, 0.4 to 1.0 wt % be contained relative to the entire polyester resin composition that constitutes the polyester film when the thickness of the film that is finally obtained is 2 to 20 μm. If the particle content is less than 0.4 wt %, particles do not easily separate out to the film surface so that the sizes of dispersions of wax cannot be made uniform; furthermore, the filling factor of the wax becomes less than 20% so that the anti-stick property may not be sufficient or the transfer marks of the wax cannot be restrained and therefore there is a tendency toward poor print property.

Furthermore, if the particle content exceeds 1.0 wt %, the filling factor of the wax can exceed 20%, but the coating liquid of the wax gathering around a particle and the liquid of the wax gathering around an adjacent particle are likely to contact so that islands of the wax whose island areas exceed 200 μm$^2$ are likely to be produced, resulting in a tendency toward poor print property. If the particle content is greater than or equal to 0.4 wt % and less than or equal to 1.0 wt %, the number of particles that separate out to the film surface can be made within a proper range so that islands of the wax whose island areas exceed 200 μm$^2$ can be restrained from being produced and the filling factor of the wax can be made high. Furthermore, the deterioration of the anti-stick property based on the surface protrusions of particles can also be prevented.

The foregoing advantageous effects can be particularly conspicuously obtained by combining the foregoing (a) and at least one of the foregoing (b) to (e). The advantageous effect based on the foregoing (b) is considered to be caused because performing an electric discharge treatment on the film surface in the atmosphere can particularly cause hydroxyl groups to adhere to surfaces of particles and therefore can gather more wax around the particles so that the dispersibility of wax can be increased.

It is preferable that the number of protrusions (SPc) on the surface having wax is 300 to 500/0.2 mm$^2$. The number of protrusions (SPc) is determined by a measurement method described below and is an indicator that represents the surface shape of the film. By making the number of protrusions in SPc within this range, the separating-out of particles on the film surface described above can result in a proper amount and therefore the dispersibility of the wax can be increased.

Furthermore, the protrusions provided on the film surface have a role of supporting the transfer layer when the film is wound up. Therefore, if the number of protrusions (SPc)is less than 300/0.2 mm$^2$, it becomes difficult in some cases to restrain transfer marks. Particularly, when the number of islands of wax having an area per island exceeding 50 μm$^2$ is greater than or equal to 10, the number of protrusions (SPc) being greater than or equal to 300/0.2 mm$^2$ will make it easier to restrain transfer marks. When the number of protrusions provided on the film surface exceeds 500/0.2 mm$^2$, the friction due to protrusions has influence so that, when a thermal transfer ribbon is made from the film, the anti-stick property may deteriorate in some cases. It is preferable that the number of protrusions (SPc) be equal to or less than 400/0.2 mm$^2$, from the viewpoint of the anti-stick property when the film is made into a thermal transfer ribbon. To make the number of protrusions of SPc within the foregoing range, what can be cited is to make the sizes of particles contained in the film and the content of the particles within preferred ranges and form the film under conditions described below or the like.

It is preferable that the polyester film contain particles and the particles be exposed on the surface of the polyester film. Furthermore, it is a preferred mode that the particles are contained in islands of wax present on the surface of the film. This is because when the film is wound up, transfer marks of islands of the wax can be more easily prevented.

As for the species of the particles added to the film, silica, alumina, calcium carbonate, magnesium oxide, titanium oxide, barium sulfate and so forth can be cited. In particular, a microporous silica which is high in pore volume and high in oil absorbing performance and whose secondary particle is high in aggregability and which has been produced from a gel method silica can be preferably used. As for the particle, it is preferable that the pore volume of the particle be 1.0 ml/g to 3.0 ml/g.

The size of the particle added changes depending on the thickness of the film. However, when the thickness of the polyester film is 2 to 20 μm, it is preferable that the size of the particle be 2 to 3.5 μm. If the size of the particle is less than 2 μm, the area of exposure of particles on the surface of the film becomes small so that, in some cases, the filling factor of the wax may decrease or the number of protrusions (SPc) on the surface of the film may become hard to form. Furthermore, if the size of the particle becomes larger than 3.5 μm, particles become likely to fall apart so that production steps of the film may be messed in some cases. The size of the particle mentioned represents an average particle diameter determined by a measurement method described below.

As for electric discharge treatment for the surface of the film, the electric discharge treatment disclosed in Japanese Unexamined Patent Publication bulletin (Kokai) No. 2012-206045 and the like can be cited as examples and it is preferable to perform the electric discharge treatment so that unevenness does not occur in the process.

Next, a production method for the polyester film will be described.

With regard to the production method for the polyester film, in a film formation apparatus that includes an extruder, a polyester resin containing a particle is vacuum-dried and then melted, and formed into a film shape by using a slit-shaped die, and then wrapped around a casting drum having a surface temperature of 20 to 70° C. so that the polyester resin is cooled and solidified to provide an unstretched film. Subsequently, the film is stretched to be 3.0 to 7.0 times in a machine direction at 80 to 130° C. so that a uniaxially stretched film is obtained. At this time, multi-stage stretching is performed, whereby a film strongly orientated in the machine direction can be obtained without impairing the film formability.

As for the polyester film, it is a preferable mode that the polyester film is obtained by steps of subjecting at least a one-side surface of the polyester film prior to completion of crystal orientation to an electric discharge treatment, and coating the electric discharge treatment-subjected surface with a coating liquid containing a wax, and then stretching the obtained polyester film at least in a uniaxial direction and, after that, subjecting the polyester film to a heat treatment so that the crystal orientation of the polyester film is completed.

According to this method, film formation of the polyester film and the coating and drying of the coating liquid containing wax can be simultaneously performed so that the yield can be made high and the dispersion diameter of wax can be made uniform.

Particularly, to perform a uniform electric discharge treatment on the surface, it is a preferable mode to carry out a corona electric discharge treatment on a surface of the machine direction stretched polyester film which is to be coated with a coating liquid containing wax, under the conditions: an electric discharge density of $0.5 \times 10^4$ W/m$^2$ to $2.0 \times 10^4$ W/m$^2$ and a treatment time of 0.01 to 0.05 second. After being subjected to the electric discharge treatment, the film is coated with the coating liquid containing wax and, preferably, heated and dried at a temperature of 90° C. to 130° C. It is preferable that the wax be uniformly coated.

As for the output of the corona electric discharge treatment, if the electric discharge density exceeds $2.0 \times 10^4$ W/m$^2$, the film surface side of the polyester film which has not been given electric charges is also treated so that when the film is used as a thermal transfer ribbon that has an ink layer provided on the surface not treated with the electric discharge treatment, there is a tendency that detachment of the ink becomes less easy and the image clearness in transfer to a receiving paper deteriorates.

Furthermore, if the electric discharge treatment is of less than $0.5 \times 10^4$ W/m$^2$, the electric charge to the polyester film becomes insufficient, leading to a tendency that the coating liquid containing the wax is not uniformly coated. A preferable range of the electric discharge density is $1.0 \times 10^4$ W/m$^2$ to $1.8 \times 10^4$ W/m$^2$.

Furthermore, as for the time of the corona electric discharge treatment, it is preferable to carry out the treatment for 0.01 second to 0.05 second. If the time of the electric discharge treatment is less than 0.01 second, the amount of electrical discharge becomes insufficient so that, in some cases, the coating liquid containing the wax is not uniformly coated. Furthermore, if the time of the electric discharge treatment exceeds 0.05 second, excessive electric discharge is given so that when the film is used as a thermal transfer ribbon provided with an ink layer on its surface that is not treated with the electric discharge treatment, there is a tendency that detachment of the ink becomes less easy and the image clearness in transfer to a receiving paper deteriorates.

A preferable range of the time of the electric discharge treatment is 0.01 second to 0.04 second. By employing this condition, it becomes possible to achieve uniform coating even if the thickness of the wax is thin. Furthermore, by making the electric discharge density and the electric discharge treatment time within the foregoing ranges, it becomes easier to give a wax gathering effect to the surfaces of particles that separate out to the film surface so that the dispersibility of the wax will become good. As for the drying, heating at a temperature of, preferably, 90° C. to 130° C., will evaporate (dry) the solvent (water) in the coating liquid.

Next, the film, while both ends thereof are gripped with clips, is led to a tenter, and laterally stretched to be 3.0 to 4.5 times in a direction perpendicular to the machine direction in an atmosphere heated to 90 to 140° C. By stretching the film in at least a uniaxial direction after coating the film, it becomes possible to further finely disperse the wax.

To achieve a planarity and a dimensional stability of the thus obtained polyester film, heat fixation is performed at 200° C. to 240° C. If the temperature is lower than 200° C., thermal crystallization does not sufficiently progress, resulting in a film that is low in crystallinity. If the temperature is higher than 240° C., the thermal crystallization excessively progresses so that the orientation of molecular chains which has progressed due to stretching decreases. It is also possible to further stretch the film in the machine direction or the transverse direction or both the machine direction and the transverse directions prior to the heat fixation to increase the strength. After the heat fixation, the film is shrunken by 0 to 8% in a transverse direction at 100 to 185° C. and then wound up in the form of a roll.

According to the production method for the polyester film, it becomes possible to obtain a polyester film that is excellent in the running stability at the time of production or the time of processing of the film and that is capable of preventing transfer marks of protrusions of particles contained in the film and transfer marks of the wax on the reverse surface side of the film when the film is wound up.

The polyester film can be preferably used as an ink ribbon for thermal transfer. Using this ink ribbon for thermal transfer, an ink ribbon for thermal transfer can be produced.

EXAMPLES

Next, the polyester film will be concretely described by examples. The evaluation methods are as follows.
Evaluation Method
(a) The Filling Factor of the Film Surface of the Wax and the Numbers of Islands Having Areas Per Island Exceeding 50 μm$^2$ and 200 μm$^2$:

A film surface of a polyethylene terephthalate film of 4.5 μm in thickness substantially not containing particles was magnified 50 times by using a microscope (ECLIPSE-LV100 made by NIKON CORPORATION) and field-of-view regions were photographed. The photograph was input to an image software program, HALCON 11 (made by LinX Corporation), and a threshold value was provided as reference A.

A photograph image at the time of observing the film surface provided with wax from an upper side was picked up and the film surface was magnified 50 times by using a microscope (ECLIPSE-LV100 made by NIKON CORPORATION) and a field-of-view region was photographed. The photograph was input to an image software program, HALCON 11 (made by LinX Corporation) and, using as a basis the reference A obtained as mentioned above, was binarized into dark portions and light portions. The total area (pixels) of the dark portions, the dark portion proportion (%) of the dark portions, and the areas (pixels) of the individual dark portion regions were determined. The dark portion proportion (%) with regard to the dark portions was determined as the filling factor (a)(%) of the wax. Furthermore, from the binarized subject area (μm$^2$), the total area (pixel) of the dark portions, and the dark portion proportion (%) of the dark portions, the area (μm$^2$) per 1 pixel was determined, which was then multiplied by the areas (pixels) of the individual dark portion regions to determine the areas (um$^2$) of the individual islands of the wax. Then, the number (b-1) of islands of the wax per 10000 μm$^2$ having an island area per wax piece exceeding 50 μm$^2$ and the number (b-2) of islands of the wax per 10000 μm$^2$ having an island area per wax piece exceeding 200 μm$^2$ were counted.

This was repeated 10 times to determine an average value of the filling factors (a) (%) of the wax as the filling factor (%) of the wax in the film surface, an average value of the numbers (b-1) of islands of the wax per 10000 μm$^2$ having an island area per wax piece exceeding 50 μm$^2$ as the number of islands of the wax per 10000 μm$^2$ having an island area per wax piece exceeding 50 μm$^2$, and an average value of the numbers (b-2) of islands of the wax per 10000

μm² having an island area per wax piece exceeding 200 μm² as the number of islands of the wax per 10000 μm² having an island area per wax piece exceeding 200 μm².

(b) The Number of Protrusions (SPc):

Using a 3-dimensional surface roughness meter (ET-30HK made by Kosaka Laboratory Ltd.), the surface of the film having the wax was subjected to measurement of the number of protrusions by a probe method under the following conditions. This was repeated 5 times, and an average was determined as the number of protrusions (SPc).
Probe diameter: 2 (μmR)
Probe pressure: 10 (mg)
Measurement length: 500 (μm)
Longitudinal magnification ratio: 20000 (times)
Lower range cut-off: 0.25 mm, Higher range cut-off: R+W
Measurement speed: 100 (μm/s)
Measurement interval: 5 (μm)
Number of records: 81
Hysteresis width: ±0 (nm)
Reference area: 0.2 (mm²)

(c) Print Property Evaluation and Anti-stick Property Evaluation:

The opposite surface of the transfer layer of the film to the surface provided with the wax was coated at a temperature of about 100° C. with a melt type ink indicated below which was melted and stirred at a temperature of 120° C., by using a hot melt coater, such that the thickness of the ink layer finally obtained became 0.5 μm. Thus, a thermal transfer ribbon was obtained.

Melt Type Ink
- Carnauba wax (Carnauba No. 1, made by Toyo Adl Corporation): 30 parts by weight
- Paraffin wax (HNP-10, made by Nippon Seiro Co., Ltd.): 35 parts by weight
- Carbon black (MA-8, made by Mitsubishi Chemical Corporation): 15 parts by weight
- Ethylene vinyl acetate copolymer (MB-11, made by Sumitomo Chemical Company, Limited): 10 parts by weight Print Property Evaluation A thermal transfer ribbon was subjected to printing by a thermal transfer printer (a high definition printer Color Printer 28-gradation software program "PALMIX" made by Seiko Denshi Kogyo KK.), and the image was checked by visual observation and evaluated using the following references, with ○ and ⊙ determined as being passed.
⊙: Good without print unevenness.
○: Slight print unevenness and print concentration decrease is recognizable.
×: Print unevenness and print concentration decrease are recognizable.

Anti-stick Property

The anti-stick property was also checked during printing and was evaluated using the following references. ○ and ⊙ were determined as being passed.
⊙: Smooth running occurs without fusion.
○: Running occurs despite partial fusion.
×: Fusion occurs, causing wrinkles.

(d) Content of the Particle 1 g of the film was put into 200 ml of a 1 N-KOH methanol solution and dissolved by heating and refluxing. After dissolving ended, 200 ml of water was added to the solution. Subsequently, the liquid was subjected to a centrifugal separator to precipitate an inert particle, and the supernatant liquid was removed. The particle was further subjected to addition of water, washing, and centrifugal separation, which were repeated twice. The particle obtained in this manner was dried and the content of the particle was calculated.

(e) Average particle Diameter of the Particle:

This refers to a value of a number average particle diameter determined by arbitrarily measuring the particle diameters of 100 particles at a time with regard to the particle before being added to the resin (film), under a scanning electron microscope (SEM) at a magnification ratio of 50000 times according to JIS-H7804 (2005). (When the particle is not spherical, approximation to an ellipse that is the closest in shape is carried out and the (major axis+minor axis)/2 regarding the ellipse is determined).

(f) The Thickness of the Polyester Film and the Thickness of the Wax:

From a photograph covering a sectional surface of a polyester film provided with the wax which was obtained using a transmission type electron microscope HU-12 type made by Hitachi, Ltd., the thickness of the polyester film and the maximum thickness of the wax were determined. The thickness of the polyester film was determined as an average value of the thicknesses of the polyester film excluding the wax at arbitrary 10 points in the measurement field of view. Furthermore, the thickness of the wax was determined as an average value of the maximum thicknesses of the wax at 10 points within a field-of-view region.

Example 1

A polyethylene terephthalate resin chip containing 0.4 wt % of silica particles having a number average particle diameter of 2.7 μm was melted at a temperature of 185° C., and melt-extruded from a die into a sheet shape, and then placed in close contact with a rotation cooling drum having a temperature of 25° C. to become solidified. Thus, an unstretched film was obtained. Next, using the circumferential speed difference of heated rolls, the film was stretched to be 2.4 times in the machine direction of the film at a temperature of 125° C. (the first stage stretching) and then stretched to be 2.5 times in the machine direction of the film at a temperature of 115° C. (the second stage stretching). Thus, a uniaxially stretched film was obtained.

A one-side surface of the uniaxially stretched film was subjected to the electric discharge treatment for 0.01 second under the condition of an electric discharge density of $1.8 \times 10^4$ W/m², and uninterruptedly moved to a coating step, where the film surface subjected to the electric discharge treatment was coated with a coating liquid as follows.

Coating Liquid (i) After paraffin wax was melted at a temperature of 110° C. (melting temperature), a non-ionic surface-active agent, a phosphoric acid ester (butoxyethylate), ammonium oleate, and 2-amino-2-methyl propanol, each in an amount of 1 part by weight, were added, water having a temperature of 100° C. was added, and vigorous stirring was performed. Furthermore, a homogenizer was used to carry out dispersion. Thus, a paraffin wax-water dispersion was obtained.

(ii) After a vegetable wax [an ester compound of {hydrogenated rosin•αβ-substituted ethylene (α-substituent: carboxyl; and β-substituent: methyl) adduct}•alkyl (carbon number: 6) poly(repeating unit: 5)alcohol] was melted at 110° C. (melting temperature), a non-ionic surface-active agent, a phosphoric acid ester (butoxyethyl compound), ammonium oleate, and 2-amino-2-methyl propanol, each in an amount of 1 part by weight, were added, water having a temperature of 100° C. was added, and vigorous stirring was performed. Furthermore, a homogenizer was used to carry out dispersion. Thus, a vegetable wax-water dispersion was obtained.

(iii) The paraffin wax-water dispersion and the vegetable wax-water dispersion obtained in the foregoing (i) and (ii) were mixed at the following proportions and, furthermore, diluted with water so that the total solid content weight ratio became 0.45 wt %. Thus, a coating liquid was obtained.

Paraffin wax-water dispersion 60 parts by weight (solid content ratio)

egetable wax-water dispersion: 40 parts by weight (solid content ratio)

The coating with the coating liquid was performed by a bar coating method with a metering bar used so that the wet thickness was 4.5 μm.

Next, the thus obtained film, while both edges thereof were gripped with clips, was led to a tenter, pre-heated at a temperature of 110° C., and then stretched to be 4.0 times in the transverse direction while being heated to 120° C. and, furthermore, subjected to a heat treatment at a temperature of 230° C., and relaxed by 4.0% in the transverse direction at a temperature of 150° C. Thus, a polyester film was obtained. FIG. 2 shows a drawing-substituting photograph obtained when the surface on a wax-provided side of a polyester film obtained in Example 1 was magnified 50 times under a microscope. Results are shown in Table 1.

Examples 2 to 4, Comparative Examples 1 to 3, and Comparative Examples 5, 6 and 8

Polyester films were obtained in substantially the same manner as in Example 1, except that the amounts of particle contained in the films, the coating methods for the coating liquid, the presence or absence of the electric discharge treatment, and the wax thicknesses were as in Table 1. Results are shown in Table 1.

Concretely, as for Example 2, a polyester film was obtained by changing the particle content in the polyester film of Example 1 from 0.4 wt % to 0.8 wt % and not changing the other conditions.

As for Example 3, a polyester film was obtained by changing the particle content in the polyester film of Example 1 from 0.4 wt % to 0.6 wt % and not changing the other conditions.

As for Example 4, a polyester film was obtained in substantially the same manner as in Example 1, except that the coating method for the wax in Example 1 was changed from the bar coating method to a gravure coating method.

As for Comparative example 1, a polyester film was obtained in substantially the same manner as in Example 1, except that the particle content in the polyester film of Example 1 was changed from 0.4 wt % to 0.2 wt % and, furthermore, the coating method for the wax was changed from the bar coating method to the gravure coating method and the electric discharge treatment was not performed.

As for Comparative example 2, a polyester film was obtained in substantially the same manner as in Example 1, except that the coating method for the wax was changed from the bar coating method to the gravure coating method and the electric discharge treatment was not performed.

As for Comparative example 3, a polyester film was obtained in substantially the same manner as in Example 1, except that the particle content in the polyester film of Example 1 was changed from 0.4 wt % to 0.3 wt % and the coating method for the wax was changed from the bar coating method to the gravure coating method.

As for Comparative example 5, a polyester film was obtained in substantially the same manner as in Example 1, except that the particle content in the polyester film of Example 1 was changed from 0.4 wt % to 0.3 wt %.

As for Comparative example 6, a polyester film was obtained in substantially the same manner as in Example 1, except that the particle content in the polyester film of Example 1 was changed from 0.4 wt % to 0.2 wt %.

As for Comparative example 8, a polyester film was obtained in substantially the same manner as in Example 1, except that the particle content in the polyester film of Example 1 was changed from 0.4 wt % to 1.2 wt %.

Example 5

A polyester film was obtained in substantially the same manner as in Example 1, except that the amount of particle contained in the film, the coating method for the coating liquid, and the presence or absence of the electric discharge treatment were just as in Table 1, and a coating liquid diluted with water so that the total solid content weight ratio became 1.0 wt % was used, and the wet thickness was 2.0 μm. Results are shown in Table 1.

Comparative Example 4

A polyester film was obtained in substantially the same manner as in Example 1, except that the film obtained in Example 1 was pulverized and used in an amount of 30 wt % as a raw material of a polyethylene terephthalate film, and melting was performed at a temperature of 250° C., and the wet thickness as the amount of coating of the wax was changed to 4.0 μm. Results are shown in Table 1.

Comparative Example 7

A polyester film was obtained in substantially the same manner as in Example 5, except that the particle content in the polyester film of Example 5 was changed from 0.4 wt % to 1.2 wt % and the electric discharge treatment was performed. Results are shown in Table 1.

Recapitulation of Examples and Comparative Examples

As for Example 1, the wax filling factor on the film surface was within our range, an island having an island area exceeding 200 μm² was not recognized and the print property and the anti-stick property were sufficient.

As for Example 2, since the content of particle was twice that in Example 1, the number of protrusions (SPc) on the surface of the film was greater than in Example 1 so that the filling factor of the wax on the film surface was higher. Although islands of the wax having an area per island exceeding 200 μm² were recognized, the print property was at such a degree that only a slight unevenness was observed so that the film was able to be used without any problem.

As for Example 3, since the content of particle was 1.5 times that in Example 1, the number of protrusions (SPc) on the surface of the film was greater than in Example 1 so that the filling factor of the wax on the film surface was higher. Although islands of the wax having an area per island exceeding 200 μm² were recognized, the print property and the anti-stick property were sufficient.

As for Example 4, although the coating method in Example 1 was changed, the print property and the anti-stick property were sufficient.

As for Example 5, since the film of Example 4 was subjected to coating without having been subjected to the electric discharge treatment, islands of the wax having an area per island exceeding 200 µm² were recognized. This is considered to be because wax areas were joined between adjacent particles. Furthermore, the number of islands of the wax having an area per island exceeding 50 µm² was smaller than in Example 1 so that the anti-stick property and the print property were a little insufficient but at such a level so that the film could be used without a problem.

As for Comparative example 1, since the content of particle was 0.2 wt % and the coating was performed by the gravure coating method, an island having an island area exceeding 200 µm² was not recognized. However, since the electric discharge treatment was not performed and the surface formation of particles was not sufficient, the wax filling factor was not sufficient and the anti-stick property deteriorated.

As for Comparative example 2, since the particle content was 0.4 wt % and the coating was performed by the gravure coating method so that the coating thickness was twice that in Example 5, the anti-stick property was sufficient. However, since the electric discharge treatment was not performed, islands of the wax having an island area exceeding 200 µm² were recognized and a little more print unevenness occurred.

As for Comparative example 3, since the coating was performed by the gravure coating method and the electric discharge treatment was carried out, an island of the wax having an island area exceeding 200 µm² was not recognized. However, since the particle content was insufficient, the number of protrusions (SPc) was insufficient, and the filling factor of the wax in the film surface was less than 20% so that the anti-stick property deteriorated.

As for Comparative example 4, since the film was used as a recovered material in a substrate although the particle content was 0.4 wt %, the wax separated out on the surface of the substrate film caused the filling factor of the wax to exceed 20%. However, islands of the wax having island areas exceeding 200 µm² were recognized and much print unevenness occurred. Furthermore, foreign matter occurred on the film surface so that the anti-stick property deteriorated.

As for Comparative examples 5 and 6, since the electric discharge treatment was performed, an island exceeding 200 µm² was not recognized. However, since the particle contents were insufficient, the numbers of protrusions (SPc) were small, and the filling factors of the wax in the film surface were less than 20% so that the anti-stick property deteriorated.

As for Comparative examples 7 and 8, it is considered that since addition was made so that the particle content was 1.2 wt %, the numbers of protrusions (SPc) of the films were great so that after the wax was dispersed around particles on the film surface, wax areas joined together between adjacent particles, the filling factor of the wax exceeded 20%, and the film surface had many islands exceeding 200 µm². As a result, the anti-stick property improved but the print property deteriorated.

TABLE 1

| | Particle content in polyester film (wt %) | Filling factor of the wax (%) | Number of islands of wax having an area per island exceeding 50 µm² (islands) | Number of islands of wax having an area per island exceeding 200 µm² (islands) | SPc number of protrusions (protrusions) | Coating method for the coating liquid | Presence/absence of electric discharge treatment | Anti-stick property evaluation | Print evaluation | Average particle diameter (µm) | Thickness of polyester film (µm) | Thickness of wax (nm) |
|---|---|---|---|---|---|---|---|---|---|---|---|---|
| Example 1 | 0.4 | 21.5 | 15.3 | 0 | 333 | Bar coating | Present | ⊙ | ⊙ | 2.7 | 4.5 | 5 |
| Example 2 | 0.8 | 28 | 27 | 0.6 | 456 | Bar coating | Present | ⊙ | ○ | 2.7 | 4.5 | 5 |
| Example 3 | 0.6 | 26 | 21 | 0.5 | 380 | Bar coating | Present | ⊙ | ⊙ | 2.7 | 4.5 | 5 |
| Example 4 | 0.4 | 22.5 | 17.1 | 0.2 | 313 | Gravure coating | Present | ⊙ | ⊙ | 2.7 | 4.5 | 5 |
| Example 5 | 0.4 | 21.5 | 10.8 | 0.7 | 320 | Gravure coating | Absent | ○ | ○ | 2.7 | 4.5 | 5 |
| Comparative example 1 | 0.2 | 14 | 5.1 | 0 | 248 | Gravure coating | Absent | X | ○ | 2.7 | 4.5 | 5 |
| Comparative example 2 | 0.4 | 21.5 | 11.5 | 1.1 | 313 | Gravure coating | Absent | ○ | X | 2.7 | 4.5 | 10 |
| Comparative example 3 | 0.3 | 18.7 | 12.5 | 0 | 260 | Gravure coating | Present | X | ○ | 2.7 | 4.5 | 5 |
| Comparative example 4 | 0.4 | 24.5 | 21.2 | 2 | 320 | Bar coating | Present | ⊙ | X | 2.7 | 4.5 | 4 |
| Comparative example 5 | 0.3 | 18.3 | 11.5 | 0 | 262 | Bar coating | Present | X | ○ | 2.7 | 4.5 | 5 |
| Comparative example 6 | 0.2 | 16.2 | 8.2 | 0 | 245 | Bar coating | Present | X | ○ | 2.7 | 4.5 | 5 |
| Comparative example 7 | 1.2 | 27 | 21 | 1.2 | 660 | Gravure coating | Present | ⊙ | X | 2.7 | 4.5 | 5 |
| Comparative example 8 | 1.2 | 28 | 30 | 2 | 670 | Bar coating | Present | ⊙ | X | 2.7 | 4.5 | 5 |

The invention claimed is:

1. A polyester film containing particles that form protrusions on a surface of one side of the film and having a wax on the surface having the protrusions, wherein a number of the protrusions (SPc) on the surface is 300 to 500/0.2 mm², the wax is dispersed in a form of islands on the surface of the film, the particles are contained in the islands, a filling factor of the wax in the film surface is 20 to 45%, and, a number of islands of the wax dispersed in the form of islands and each of which has an area of 200 $\mu m^2$ or larger is one or less /10000 $\mu m^2$.

2. The polyester film according to claim 1, wherein the polyester film contains the particles in an amount of 0.4 to 1.0 wt % relative to an entire polyester resin composition that constitutes the film and a thickness of the film is 2 to 20 $\mu$m.

3. An ink ribbon for thermal transfer comprising the polyester film according to claim 1.

4. A thermal transfer ink ribbon in which a one-side surface of the polyester film according to claim 1 is provided with a transfer layer and a surface opposite to the transfer layer is provided with a slipping layer comprising the wax.

5. A process of producing the polyester film described in claim 1 comprising forming a polyester sheet under at least one of conditions (a) to (d):
   (a) an amount of particles contained in the sheet is 0.4 to 1.0 wt %,
   (b) subjecting a surface of the sheet to an electric discharge treatment under a specific condition, and applying a coating liquid containing the wax to the sheet to form the film, wherein the specific condition is, following a corona electric discharge treatment on a surface of a machine direction of stretched polyester sheet which is to be coated with the coating liquid containing the wax, under the conditions: an electric discharge density of $0.5 \times 10^4$ W/m$^2$ to $2.0 \times 10^4$ W/m$^2$ and a treatment time of 0.01 to 0.05 seconds,
   (c) wax concentration (solid content concentration) in the coating liquid is 0.3 wt % to 1.0 wt %, and
   (d) applying the coating selected from a bar coating method or a gravure coating method, to thereby produce the film.

6. A process of producing the polyester film described in claim 2 comprising forming a polyester sheet under at least one of conditions (a) to (d):
   (a) an amount of particles contained in the sheet is 0.4 to 1.0 wt %,
   (b) subjecting a surface of the sheet to an electric discharge treatment under a specific condition, and applying a coating liquid containing the wax to the sheet to form the film, wherein the specific condition is, following a corona electric discharge treatment on a surface of a machine direction of stretched polyester sheet which is to be coated with the coating liquid containing the wax, under the conditions: an electric discharge density of $0.5 \times 10^4$ W/m$^2$ to $2.0 \times 10^4$ W/m$^2$ and a treatment time of 0.01 to 0.05 seconds,
   (c) wax concentration (solid content concentration) in the coating liquid is 0.3 wt % to 1.0 wt %, and
   (d) applying the coating selected from a bar coating method or a gravure coating method, to thereby produce the film.

* * * * *